United States Patent
Yu et al.

(10) Patent No.: US 12,118,644 B2
(45) Date of Patent: Oct. 15, 2024

(54) DATA LOADING METHOD AND APPARATUS FOR CONVOLUTION OPERATION

(71) Applicant: Glenfly Tech Co., Ltd., Shanghai (CN)

(72) Inventors: Pengcheng Yu, Shanghai (CN); Jing Feng, Shanghai (CN); Ziwen Zhu, Shanghai (CN); Ying Quan, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 372 days.

(21) Appl. No.: 17/848,691

(22) Filed: Jun. 24, 2022

(65) Prior Publication Data

US 2023/0267571 A1 Aug. 24, 2023

(30) Foreign Application Priority Data

Feb. 21, 2022 (CN) .......................... 202210156894.8

(51) Int. Cl.
*G06T 1/60* (2006.01)
*G06T 1/20* (2006.01)

(52) U.S. Cl.
CPC ................. *G06T 1/60* (2013.01); *G06T 1/20* (2013.01); *Y02D 10/00* (2018.01)

(58) Field of Classification Search
CPC .. G06T 1/60; G06T 1/20; Y02D 10/00; G06F 12/0811; G06F 12/0895; G06F 12/0875; G06F 16/221; G06F 17/16; G06N 3/063; G06N 3/045; G06N 3/04; G06N 3/08; G06N 3/044; G06N 3/02; G06N 3/0464
See application file for complete search history.

(56) References Cited

U.S. PATENT DOCUMENTS 10,140,681 B2 * 11/2018 Kee ........................... G06T 1/20
11,468,600 B2 * 10/2022 Chen ..................... G06N 3/045
(Continued)

FOREIGN PATENT DOCUMENTS

| CN | 105243399 A | 1/2016 |
| CN | 112966807 A | 6/2021 |

(Continued)

OTHER PUBLICATIONS

China Intellectual Property Office: Office Action of Chinese Application No. 202210156894.8 (related application); Aug. 25, 2023; 5 pages.

*Primary Examiner* — Michael S Osinski (57) ABSTRACT

Disclosed are a data loading method and apparatus for a convolution operation, a computer device, a storage medium and a computer program product. The method includes: splitting a feature image to be loaded into the cache unit into a plurality of sub-feature images; determining a target cache line corresponding to each of the sub-feature images in each of the cache lines according to a positional relationship of each of the sub-feature images in the feature image; wherein target cache lines corresponding to at least two sub-feature images with the same positional relationship are located in the same cache set, and target cache lines corresponding to at least two sub-feature images with an adjacent positional relationship are located in different cache sets; loading a data content of each of the sub-feature images into the target cache line corresponding to each of the sub-feature images.

14 Claims, 10 Drawing Sheets

(56) References Cited

U.S. PATENT DOCUMENTS

| | | | | |
|---|---|---|---|---|
| 11,675,997 B2* | 6/2023 | Kim | ............... | G06F 21/52 |
| | | | | 706/15 |
| 11,726,791 B2* | 8/2023 | Wheeler | ............. | G11C 11/4096 |
| | | | | 712/210 |
| 11,783,163 B2* | 10/2023 | Liu | ........................ | G06N 3/04 |
| | | | | 706/27 |
| 11,972,155 B2* | 4/2024 | Luo | ...................... | G06F 3/0689 |
| 2008/0044107 A1* | 2/2008 | Horisaki | ................. | G06T 1/60 |
| | | | | 382/173 |
| 2011/0138157 A1* | 6/2011 | Ni | ........................ | G06F 30/00 |
| | | | | 712/225 |
| 2011/0228586 A1* | 9/2011 | Kawabata | ............ | G11C 13/004 |
| | | | | 365/148 |
| 2016/0350343 A1* | 12/2016 | Xia | ....................... | G06F 16/221 |
| 2020/0395093 A1* | 12/2020 | Kang | ................ | G11C 29/4401 |
| 2021/0142767 A1* | 5/2021 | Mo | ........................ | G06F 1/08 |
| 2021/0263849 A1* | 8/2021 | Zheng | ................ | G06F 9/30134 |
| 2021/0357736 A1* | 11/2021 | Lu | ............................ | G06N 3/045 |
| 2022/0012126 A1* | 1/2022 | Galbi | ..................... | G06F 12/12 |
| 2022/0075730 A1* | 3/2022 | Guirado | ............... | G06F 12/0875 |
| 2022/0129744 A1* | 4/2022 | Bondarenko | .......... | G06N 3/045 |
| 2022/0309778 A1* | 9/2022 | Chen | ..................... | G06V 10/95 |
| 2022/0360673 A1* | 11/2022 | Nakazato | .............. | H04N 23/80 |
| 2023/0049471 A1* | 2/2023 | Chen | ........................ | G06T 1/60 |
| 2023/0273829 A1* | 8/2023 | Xu | ......................... | G06F 7/523 |
| | | | | 712/220 |
| 2023/0342298 A1* | 10/2023 | Vasekin | ............. | G06F 12/0811 |
| 2024/0037119 A1* | 2/2024 | Zhou | ..................... | G06F 11/14 |

FOREIGN PATENT DOCUMENTS

| | | |
|---|---|---|
| CN | 113870273 A | 12/2021 |
| CN | 113919477 A | 1/2022 |
| WO | 2022007266 A1 | 1/2022 |

* cited by examiner

| a feature image to be loaded into a cache unit is split into a plurality of sub-feature images | ⟵ S110 |

| a target cache line corresponding to each sub-feature image is determined in each cache line according to a positional relationship of each sub-feature image in the feature image;target cache lines corresponding to at least two sub-feature images with the same positional relationship are located in the same cache set; and the target cache lines corresponding to at least two sub-feature images with an adjacent positional relationship are located in different cache sets | ⟵ S120 |

| a data content of each of the sub-feature images is loaded into the target cache line corresponding to each of the sub-feature images | ⟵ S130 |

DATA LOADING METHOD AND APPARATUS FOR CONVOLUTION OPERATION

CROSS-REFERENCE TO RELATED APPLICATIONS

This application claims priority to and/or benefit from Chinese patent application No. 202210156894.8, filed Feb. 21, 2022, entitled DATA LOADING METHOD AND APPARATUS FOR CONVOLUTION OPERATION, the content of which is hereby incorporated by reference in its entirety.

TECHNICAL FIELD

The present disclosure relates to the technical field of artificial intelligence, and particularly to a data loading method and apparatus for a convolution operation.

BACKGROUND

At present, when convolution operations are performed by using a mainstream artificial intelligence algorithm, feature images stored in a memory are loaded into the L1 cache, and then target data is read from the L1 cache when needed to perform the convolution operation, in order to accelerate the convolution operation by utilizing the excellent read and write speed of the L1 cache.

However, due to the read-write characteristics of the L1 cache and the operation characteristics of the convolution operation, when the L1 cache is utilized to accelerate the convolution operation in the conventional technology, it is often prone to read-write conflicts, which is not conducive to improving the efficiency of the convolution operation.

Therefore, the conventional technology has a problem that the efficiency of the convolution operation is not high.

SUMMARY

In view of this, as for the technical problem described above, it is necessary to provide a data loading method and apparatus capable of improving the efficiency of the convolution operation.

In the first aspect of the resent disclosure, a data loading method for a convolution operation is provided, which is applied to a cache unit formed by a plurality of cache banks arranged in an array, the same row of cache banks forms a cache line, a plurality of cache lines forms a cache set, the data loading method includes:
  splitting a feature image to be loaded into the cache unit into a plurality of sub-feature images;
  determining a target cache line corresponding to each of the sub-feature images in each of the cache lines according to a positional relationship of each of the sub-feature images in the feature image; wherein target cache lines corresponding to at least two sub-feature images with the same positional relationship are located in the same cache set, and target cache lines corresponding to at least two sub-feature images with an adjacent positional relationship are located in different cache sets;
  loading a data content of each of the sub-feature images into the target cache line corresponding to each of the sub-feature images.

In an embodiment, the data loading method further includes:
  after loading the data content of each of the sub-feature images into the target cache line corresponding to each of the sub-feature images,
  determining a target cache set in each cache set, wherein the target cache set comprises one of a cache set in the 2N-th line and a cache set in the (2N+1)-th line of the cache unit, and N is an integer greater than or equal to 0;
  for any cache line in the target cache set, migrating data cached in first X memory banks in any cache line to last X memory banks in a target cache line, wherein the first X memory banks are memory banks in any cache line caching data contents.

In an embodiment, the determining the target cache set in each cache set includes:
  acquiring a cache set sequence number corresponding to each cache set in the cache unit;
  determining at least one cache set with a cache set sequence number of an odd number as the target cache set; or, determining at least one cache set with a cache set sequence number of an even number as the target cache set.

In an embodiment, the loading the data content of each of the sub-feature images into the target cache line corresponding to each of the sub-feature images includes:
  acquiring original feature image data corresponding to the sub-feature images;
  determining valid feature image data in the original feature image data, wherein the valid feature image data is feature image data which actually participates in the convolution operation;
  loading the valid feature image data corresponding to the sub-feature images into the target cache lines as data contents of the sub-feature images.

In an embodiment, the determining valid feature image data in the original feature image data includes:
  acquiring convolution parameters of the convolution operation, wherein the convolution parameters comprise a convolution stride and a convolution kernel format;
  extracting the valid feature image data from the original feature image data according to the convolution stride and the convolution kernel format.

In an embodiment, the extracting the valid feature image data from the original feature image data according to the convolution stride and the convolution kernel format includes:
  determining pixel points which participate in the convolution operation from the sub-feature images and acquiring valid pixel points in the sub-feature images according to the convolution stride and the convolution kernel format;
  determining pixel values corresponding to the valid pixel points as the valid feature image data corresponding to the sub-feature images.

In an embodiment, the splitting the feature image to be loaded into the cache unit into the plurality of sub-feature images includes:
  acquiring a feature image format of the feature image and a data capacity of a single cache bank;
  splitting the feature image into the plurality of sub-feature images according to the feature image format of the feature image and the data capacity of the cache bank, to enable a data volume of a single sub-feature image to be 2M times the data capacity of the cache bank, wherein M is an integer greater than or equal to 0.

In the second aspect of the present disclosure, a data loading apparatus for a convolution operation is provided, which is applied to a cache unit formed by a plurality of cache banks arranged in an array, the cache unit includes at least one cache set, each cache set includes at least one cache line, the apparatus includes:

a split module, configured to split a feature image to be loaded into the cache unit into a plurality of sub-feature images;

a determination module, configured to determine a target cache line corresponding to each of the sub-feature images in the at least one cache line according to a positional relationship of each of the sub-feature images in the feature image, wherein target cache lines corresponding to at least two sub-feature images with the same positional relationship are located in the same cache set, and target cache lines corresponding to at least two sub-feature images with an adjacent positional relationship are located in different cache sets;

a loading module, configured to load data contents of the sub-feature images into target cache lines corresponding to the sub-feature images.

The above-mentioned data loading method and apparatus for the convolution operation are applied to a cache unit formed by a plurality of cache banks arranged in an array, the same row of cache banks forms a cache line, and a plurality of cache lines forms a cache set; a feature image to be loaded into the cache unit is split into a plurality of sub-feature images; a target cache line corresponding to each of the sub-feature images is determined in each of the cache lines according to a positional relationship of each of the sub-feature images in the feature image; target cache lines corresponding to at least two sub-feature images with the same positional relationship are located in the same cache set, and target cache lines corresponding to at least two sub-feature images with an adjacent positional relationship are located in different cache sets; a data content of each of the sub-feature images is loaded into the target cache line corresponding to each of the sub-feature images. In such a manner, the data of each equally divided sub-feature image is reasonably loaded into the L1 cache, so that when the data of two adjacent sub-feature images is required for the convolution operation at the same time, it is possible to perform the cache hit miss test on two adjacent sub-feature images within one cycle, which ensures the cache hit speed of the two adjacent sub-feature images, so that the data required for the convolution can still be read quickly when spanning the two sub-feature images, thereby avoiding a cache set split and improving the efficiency of the convolution operation.

DETAILED DESCRIPTION

In order to make the purpose, technical solution and advantages of the present disclosure clearer, the present disclosure will be further detailed with reference to the accompanying drawings and embodiments. It should be appreciated that the embodiments described herein are merely intended to explain the disclosure, rather than limiting the present disclosure.

Figure 1:
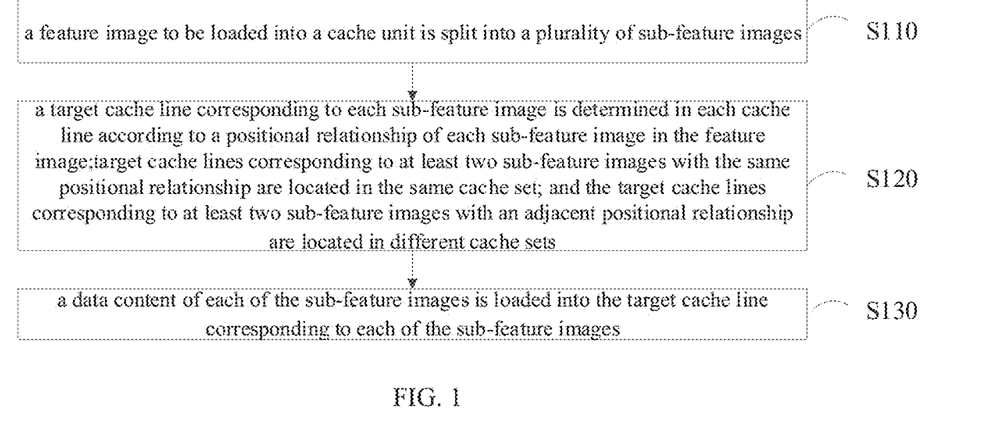
FIG. 1 is a flow chart showing a data loading method for a convolution operation according to an embodiment.
Figure 2:
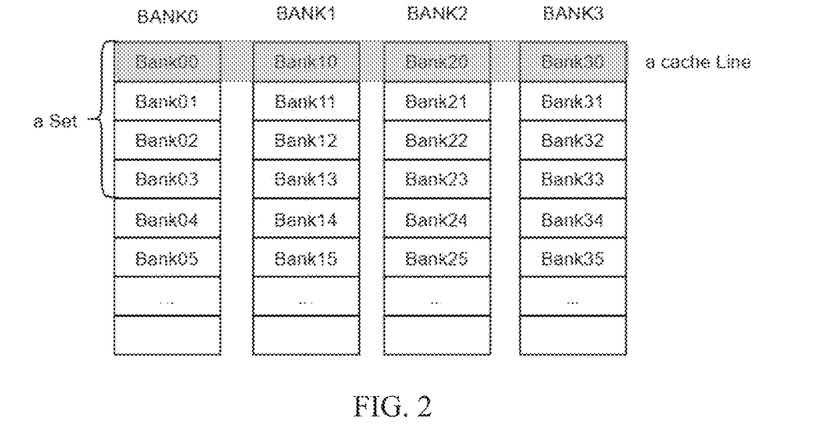
FIG. 2 is a schematic structure diagram of an L1 cache according to an embodiment.

In an embodiment, as shown in FIG. 1, a data loading method for a convolution operation is provided, and the method can be applied to a cache unit (e.g., L1 cache) as shown in FIG. 2, referring to FIG. 2, the cache unit can be formed by a plurality of cache banks arranged in an array; the same row of cache banks forms a cache line; a plurality of cache lines forms a cache set. The same column of cache banks forms a cache pool.

In the L1 cache, the cache bank is the smallest unit for reading and writing the L1 cache; and the cache line is the smallest unit for performing a cache hit miss test in the L1 cache. In each cycle, for the L1 cache, only one cache bank can be selected from each cache pool to read and write. In each cycle, for each cache set, a cache line can be selected to perform the cache hit miss test. Accordingly, the L1 cache can maintain an excellent read-write speed by using the above-mentioned read and write characteristics.

Figure 3:
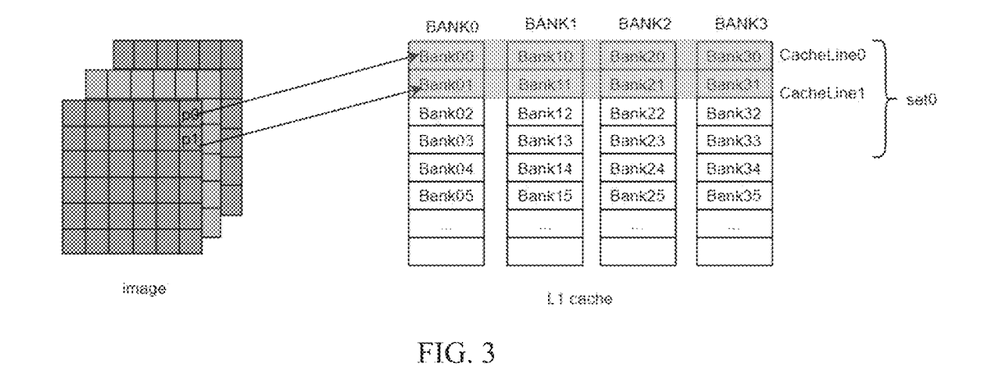
FIG. 3 is a schematic diagram showing data loading of a feature image according to an embodiment.

In the process of accelerating the convolution operation with the L1 cache, the inventors found that since the cache line is the smallest unit for performing the cache hit miss test in the L1 cache, when it is required to simultaneously read multiple data loaded into different cache lines in the same cache set during the convolution, and when the cache hit miss test is performed for the L1 cache, the cache hit miss test for the multiple data required for the convolution cannot be completed in one cycle. For example, as shown in FIG. 3, multiple feature image data p0 and p1 that need to be read at the same time are respectively loaded into a cache line 0 and a cache line 1 in a cache set 0, then the L1 cache definitely has two cycles to hit the p0 located in the cache line 0 and the p1 located in the cache line 1. At the moment, there is a hit miss test split (such as a cache set split) between the feature image data p0 and p1, which is adverse to improving the efficiency of the convolution operation.

In view of the above situation, the present disclosure provides a data loading method for a convolution operation, the method includes the following steps.

Step S110: a feature image to be loaded into a cache unit is split into a plurality of sub-feature images.

The cache unit may refer to an L1 cache.

Figure 4:
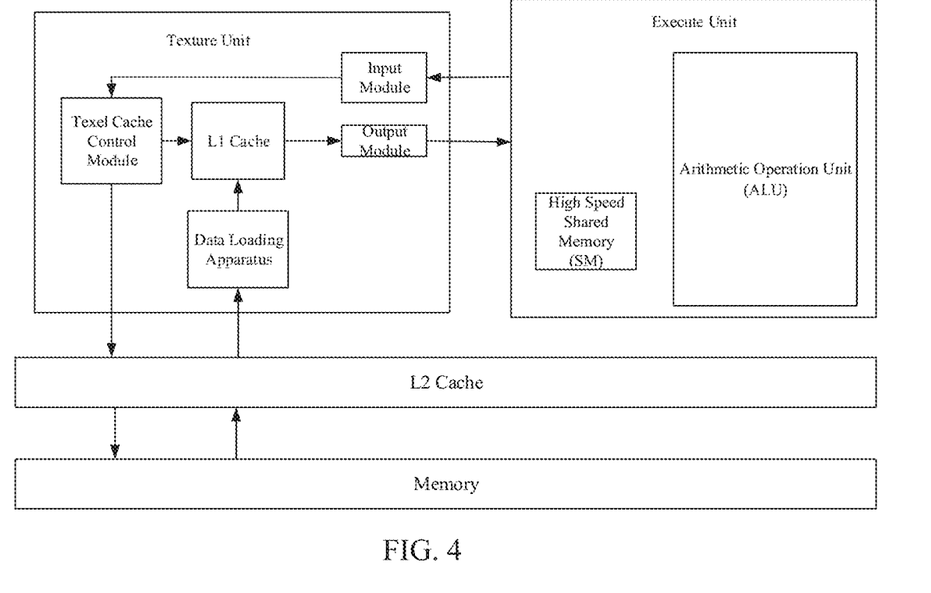
FIG. 4 is a structure diagram illustrating a processor according to an embodiment.

In the specific implementation, as shown in FIG. 4, when an artificial intelligence algorithm operates in an Arithmetic Operation Unit (ALU) which is in an execute unit in a processor (such as a Graphics Processing Unit (GPU)), a data request is sent to a texture unit when data is needed. A texture unit input (TU In) module parses data description information in the data request and transmits the data request to a texel cache control module. The texel cache control module first performs a cache hit miss test in the L1 cache according to the data request transmitted from the TU In module. If the data is hit, the data is read from the L1 cache and is returned to the execute unit through a texture unit out (TU Out) module. If the data is not hit (missed), the data is requested from an L2 cache and a memory, and the requested data (that is, a feature image on which the convolution operation needs to be performed) is written into the L1 cache from the L2 cache.

In the process of writing the feature image to be loaded into the cache unit from the L1 cache into the L1 cache, a data loading apparatus can equally split a feature image of at least one channel into a plurality of sub-feature images. Further, a preset multiple relationship exists between a data volume of a single sub-feature image and a data capacity of a single cache bank in the L1 cache. Specifically, the data volume of the single sub-feature image is $2^M$ times the data capacity of the cache bank, where M is an integer greater than or equal to 0.

Figure 5:
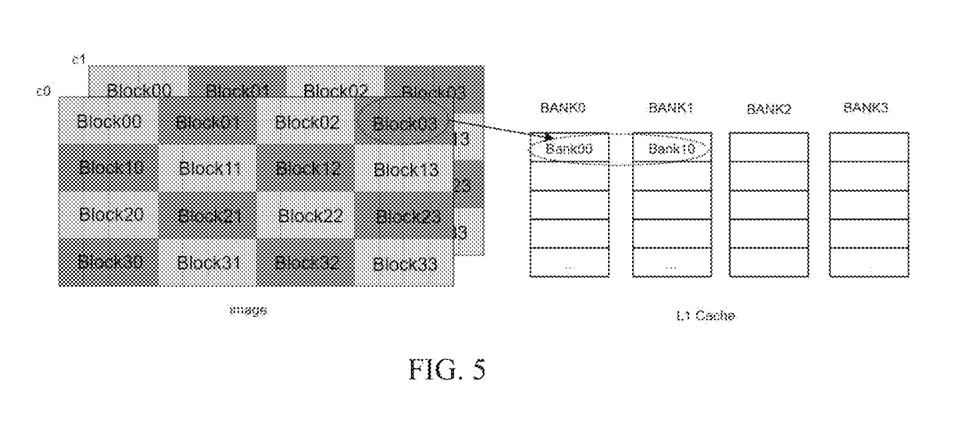
FIG. 5 is a schematic diagram showing a division of a sub-feature image according to an embodiment.

In a practical application, the sub-feature image can also be referred to as a feature block. In order to make the technical solution of the present disclosure clearer, FIG. 5 exemplarily provides a schematic diagram of a division of a sub-feature image. For example, it is given that a size of a feature image A is width*height=16*8, and a format of the feature image is 8 bit per pixel (bpp); the feature image includes two channels c0 and c1; the data capacity of the cache bank is 32 bits, and the data loading apparatus can equally split the feature image A of each channel into sixteen sub-feature images (image blocks). Each sub-feature image contains a data volume of 4*2 8bpp (64 bits); and it takes up a space for two cache banks (Bank00 and Bank10) when one sub-feature image (e.g., Block03) is written into the L1 cache.

Figure 6:
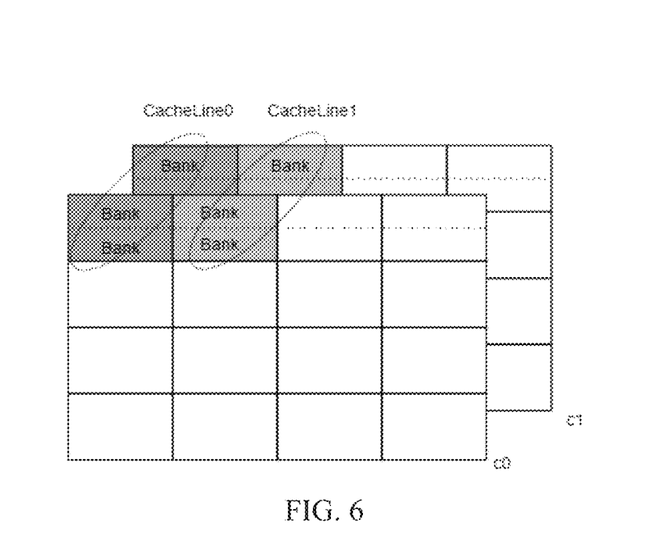
FIG. 6 is a schematic structure diagram illustrating cache lines according to an embodiment.

At this time, a number of cache banks included in the sub-feature images at the same position in the two channels just forms a cache line. Such as the sub-feature images block00 respectively in channel c0 and channel c1 shown in FIG. 6, which include four cache banks and form a cache line "cache line 0".

Step S120: a target cache line corresponding to each sub-feature image is determined in each cache line according to a positional relationship of each sub-feature image in the feature image.

The target cache lines corresponding to at least two sub-feature images with the same positional relationship are located in the same cache set; and the target cache lines corresponding to at least two sub-feature images with an adjacent positional relationship are located in different cache sets.

In a specific implementation, the data loading apparatus determines a target cache line corresponding to each sub-feature image in each cache line according to the positional relationship of each sub-feature image in the feature image.

Figure 7:
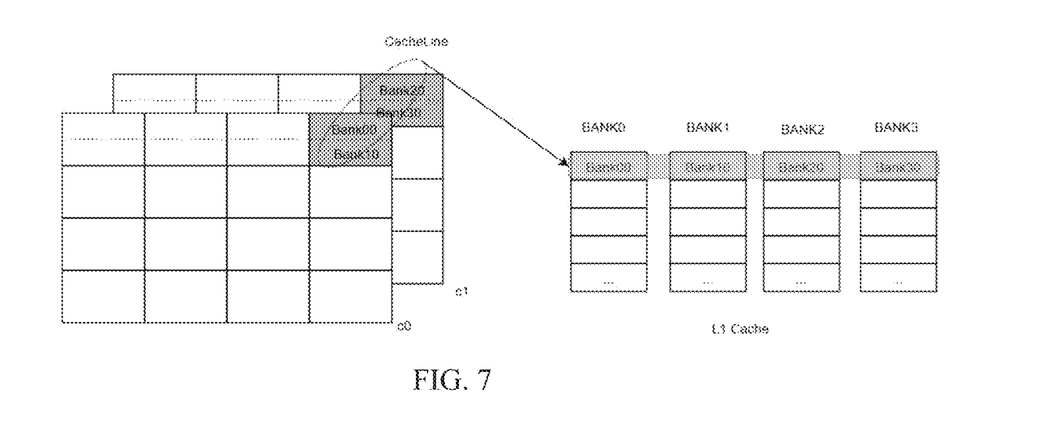
FIG. 7 is a schematic diagram showing data loading of a sub-feature image according to an embodiment.

Specifically, in the data loading apparatus, the sub-feature image can serve as a basic unit configured to load the feature image to the L1 cache. Referring to FIG. 7, the data loading apparatus loads at least two sub-feature images with the same positional relationship in each channel into the same cache line, that is, at least two sub-feature images with the same positional relationship have a corresponding target cache line.

During the convolution operation, a convolution kernel moves along adjacent areas. An adjacent sub-feature image of the current sub-feature image is a next data block to be read. In addition, the convolution kernel moves smoothly in the horizontal or vertical direction; accordingly, the convolution kernel definitely spans two sub-feature images. Thus, it is necessary to ensure that the two adjacent sub-feature images can be hit quickly, so that the data required for the convolution can still be quickly read when the convolution kernel spans the two sub-feature images. The data loading apparatus needs to load data contents of at least two sub-feature images with the same positional relationship to cache lines in the same cache set, and to load data contents of at least two sub-feature images with an adjacent positional relationship into cache lines in different cache sets respectively. That is, target cache lines corresponding to the at least two sub-feature images with the same positional relationship are located in the same cache set; and target cache lines corresponding to the at least two sub-feature images with the adjacent positional relationship are located in different cache sets.

Step S130: a data content of each of the sub-feature images is loaded into the target cache line corresponding to each of the sub-feature images.

Figure 8:
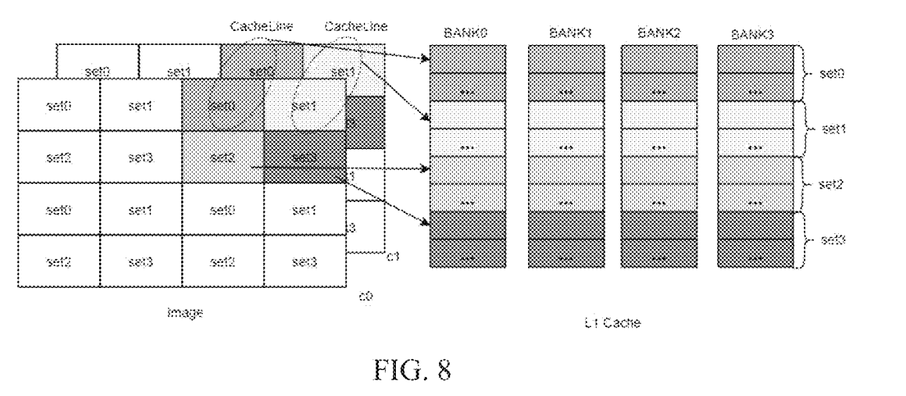
FIG. 8 is a schematic diagram illustrating a division of a target cache line according to an embodiment.

In specific implementation, the data loading apparatus loads the data content of each sub-feature image into the target cache line corresponding to each sub-feature image. Specifically, the data loading apparatus loads the data contents of the at least two sub-feature images with the same positional relationship in each channel into the same cache line, and loads the data contents of the at least two sub-feature images with the adjacent positional relationships into cache lines in different cache sets respectively. In order to facilitate the understanding of those skilled in the art, as shown in FIG. 8, in the feature image of the same channel, data of adjacent sub-feature images are loaded in different cache sets. In feature images of different channels, the data of the sub-feature images with the same position are loaded into the same cache set.

The technical solution of the above method is applied to the L1 cache formed by a plurality of cache banks arranged in an array; the same row of cache banks forms a cache line; and a plurality of the cache lines forms a cache set. The feature image loaded into the cache unit is split into a plurality of sub-feature images; the target cache line corresponding to each sub-feature image is determined in each cache line according to the positional relationship of each sub-feature image in the feature image; the target cache lines corresponding to the at least two sub-feature images with the same positional relationship are located in the same cache set; and the target cache lines corresponding to the at least two sub-feature images with the adjacent positional relationship are located in different cache sets; and then the data contents of the sub-feature images are loaded into the target cache lines corresponding to the sub-feature images. In such a manner, the data of each equally split sub-feature image is reasonably loaded into the L1 cache, so that when data of two adjacent sub-feature images are simultaneously utilized to perform the convolution operation, it is possible to perform the cache hit miss test on the two adjacent sub-feature images in one cycle, which ensures the cache hit speed of the two adjacent sub-feature images, so that the data required for the convolution can still be read quickly when spanning the two sub-feature images, thereby reducing a probability of a cache set split and improving the efficiency of the convolution operation.

Figure 9:
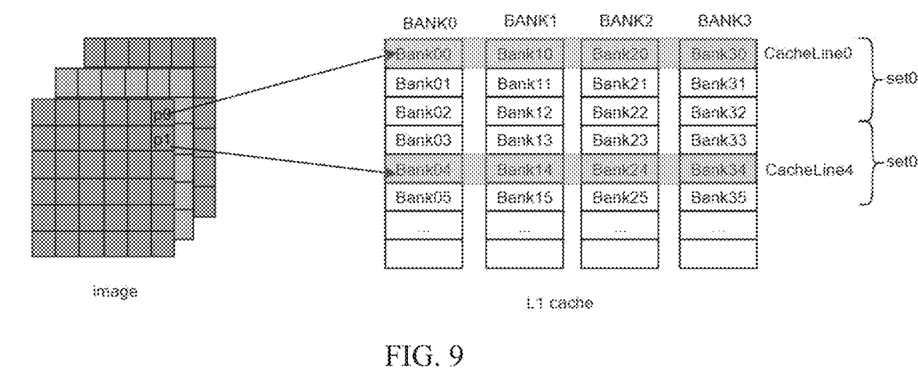
FIG. 9 is a schematic diagram showing data loading of a feature image according to another embodiment.

In the process of using the L1 cache to accelerate the convolution operation, since the L1 cache can only select one cache bank from each cache pool to read and write in each cycle, when the data required for the convolution operation is loaded into different cache banks of the same cache pool, as shown in FIG. 9, p0 and p1 in the feature image are respectively loaded into the cache banks Bank00 and Bank04 in the cache pool BANK0, then during the convolution operation, it is impossible to read p0 and p1 from the cache banks Bank00 and Bank04 of the cache pool BANK0 within one cycle, but two cycles are required. This moment, there is a bank conflict between the data p0 and p1 of the feature image, which is adverse to improving the efficiency of the convolution operation.

Figure 10:
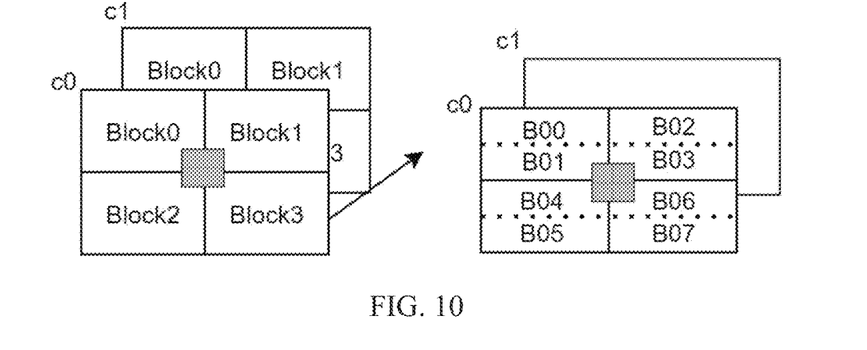
FIG. 10 is a schematic diagram showing data reading of a convolution operation according to an embodiment.

More specifically, when the convolution operation is performed, the operation is performed on all data of one channel before switching to the next channel, which means that the convolution reads the data according to the channel of the feature image. Referring to the two-channel feature image shown in FIG. 10, a gray box portion is the convolution kernel. When the convolution kernel reaches the position shown in FIG. 10, it is necessary to read the data of the sub-feature images Block0 to Block3 to perform the operation, and the feature image data of channel c0 is read before the feature image data of channel c1 is read, that is, B00, B11, B02, B03 are read first.

Figure 11:
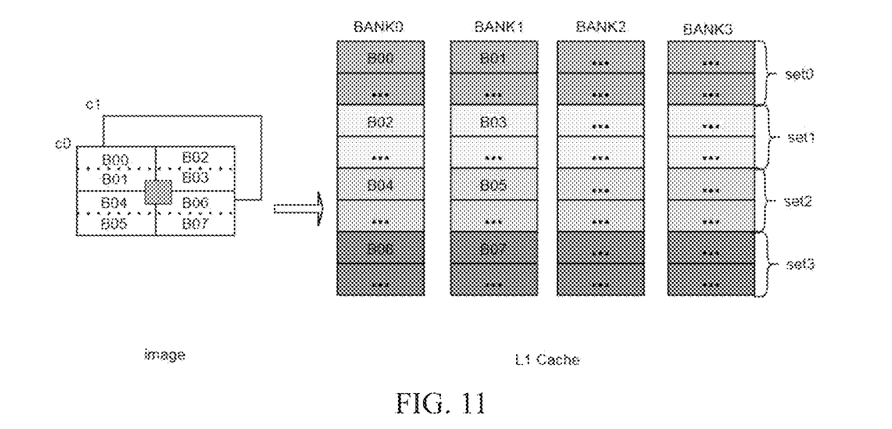
FIG. 11 is a schematic diagram showing data loading of another feature image according to an embodiment.

Referring to FIG. 11, the sub-feature images of the feature image of the channel c1 can be divided into four cache sets by the above method, that is, the sub-feature image block0 is in the cache set set0. Similarly, the sub-feature images block1, block2, block3 are respectively loaded into the cache sets set1, set2 and set3 in the L1 cache.

At the moment, the bank conflicts exist between B00 and B02 or B04 or B06, and between B01 and B03 or B05 or B07, which makes the convolution fail to read the required data in 1 cycle, and four cycles are required to read the data of the four blocks, that is, the requirements of the reading data of the convolution are as follows:

0 cycle: B00, B01;
1 cycle: B02, B03;
2 cycle: B04, B05;
3 cycle: B06, B07.

Four cycles are required in all.

In view of the above situation, in another embodiment, after the step of loading the data contents of the sub-feature images into the target cache lines corresponding to the sub-feature images, the method further includes: a target cache set is determined in each cache set; the target cache set includes one of a cache set in the 2N-th line and a cache set in the (2N+1)-th line of the cache unit; where N is an integer greater than or equal to 0; for any cache line in the target cache set, data cached in the first X memory banks in any cache line is migrated to the last X memory banks in the target cache line; the first X memory banks are memory banks in any cache line caching the data contents.

The step of determining the target cache set in each cache set includes: a cache set sequence number corresponding to each cache set in the cache unit is acquired; at least one cache set with a cache set sequence number being an odd number is determined as the target cache set; or, at least one cache set with a cache set sequence number being an even number is determined as the target cache set.

In a specific implementation, the data loading apparatus may determine a target cache set in each cache set. The target cache set includes one of a cache set in 2N-th line and a cache set in the (2N+1)-th line of the cache unit. N is an integer greater than or equal to 0. More specifically, the data loading apparatus can acquire the cache set sequence number corresponding to each cache set in the cache unit; at least one cache set with a cache set sequence number being an odd number is determined as the target cache set, or at least one cache set with a cache set sequence number being an even number is determined as the target cache set.

For example, it is given that the L1 cache includes a cache set set0, a cache set set1, a cache set set2 and a cache set set3; the data loading apparatus can take the cache set set1 and cache set set3 as the target cache sets, or, take the cache set set0 and the cache set set2 as the target cache sets.

For any cache line in the target cache set, the data loading apparatus can migrate the data cached in the first X memory banks in any cache line to the last X memory banks in the target cache line; the first X memory banks are memory banks in any cache line caching data contents, thereby reducing the number of cache banks storing data in the same cache pool, and preventing the cache banks storing the data from being concentrated in individual cache pools, and reducing the probability of cache conflict, and improving the reading efficiency of the data.

Figure 12:
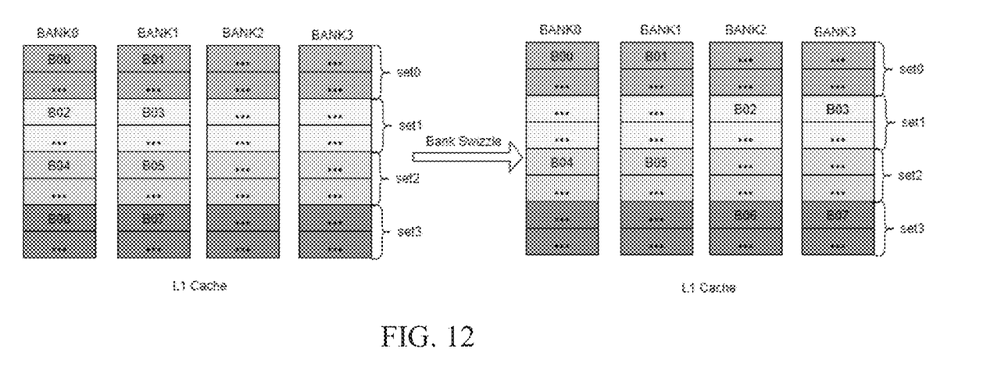
FIG. 12 is a schematic diagram illustrating data migration of an L1 cache according to an embodiment.

For example, referring to FIG. 12, the data loading apparatus can migrate data stored in the first two cache banks in each cache line in cache sets with odd sequence numbers (i.e., the cache set set1 and the cache set set3) in the L1 cache to the last two cache banks in each cache line. Data stored in cache banks in cache sets with even sequence numbers (i.e., the cache set set0 and the cache set set2) are not migrated.

In such a manner, assuming that the convolution operation needs to read B00, B11, B02, B03, B04, B05, B06 and B07, the convolution operation can read the required data within two cycles, that is, the requirements of reading data of the convolution are as flows:

0 cycle: B00, B11, B02, B03;
1 cycle: B04, B05, B06, B07.

Merely two cycles are required.

It can be seen that after the technical solution of this embodiment is adopted, time for reading data from the L1 cache can be reduced by 50%, and the reading speed is accelerated. For data reading in other cases, as long as the number of cache banks occupied by the required data in the cache does not exceed the number of cache pools in the cache, the required data can be read in the 1 cycle through the technical solution of the present embodiment. Since, in the above example, the required data occupies eight cache banks (B00 to B07), and the L1 cache consists of four cache pools, so it takes 8/4=2 cycles to read the required data at the soonest.

Figure 13:
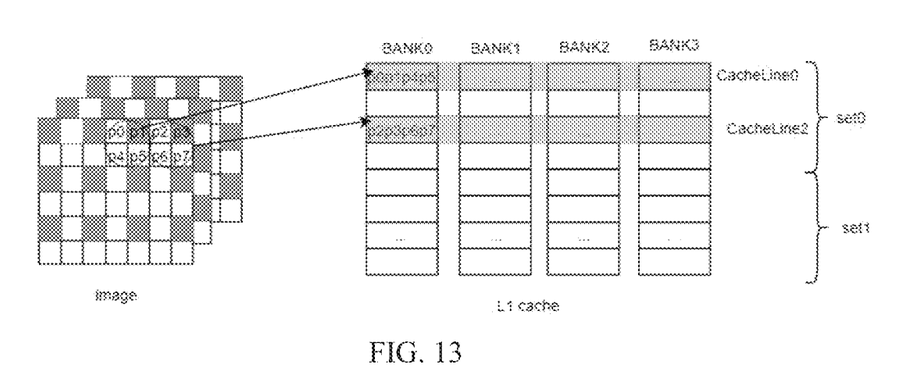
FIG. 13 is a schematic diagram showing data loading of another feature image according to another embodiment.

In the process of using the L1 cache to accelerate the convolution operation, when the convolution kernel size is smaller than a sliding stride of the convolution, the convolution skips some data during the moving process, and these skipped data does not participate in the convolution operation, so there is no need to load the skipped data in the L1 cache. However, in the related technology, all data of the feature image is loaded into the L1 cache. As shown in FIG. 13, when the convolution kernel size is 1*1 and stride=2*2, gray portions in the feature image (such as p1, p3, etc.) are the data required for the convolution, and white portions (e.g., p0, p2, p4, p5, p6, p7) do not need to be loaded into the L1 cache. In the related technology, all data of the feature image is directly loaded into the L1 cache without considering the convolution kernel size and the sliding stride of the convolution, which not only wastes the precious storage space of the L1 cache, but also makes valid data sparse, and meanwhile increases the probability of the bank conflict. As shown in FIG. 13, p0, p1, p4 and p5 are loaded into the first cache bank Bank00 of the cache pool BANK0. In fact, only p1 is valid, and ¾ of the space in the cache bank Bank00 is invalid data. Similarly, the same is true of p2, p3, p6 and p7 in the cache bank Bank02. Provided that what the convolution really needs is p1 and p3 this moment, then p1 and p3 have a bank conflict and a cache set split at the same time, which is adverse to improving the efficiency of the convolution operation.

Based on the above situation, in another embodiment, the step of loading the data contents of the sub-feature images into the target cache lines corresponding to the sub-feature images includes: original feature image data corresponding to the sub-feature images is acquired, valid feature image data in the original feature image data is determined, valid feature image data corresponding to the sub-feature images serves as data contents of the sub-feature images and are loaded into the target cache lines.

The valid feature image data is the data of the feature image that actually participates in the convolution operation.

In a specific implementation, in the process of loading the data contents of the sub-feature images into the target cache lines corresponding to the sub-feature images, the data loading apparatus can acquire the original feature image data corresponding to the sub-feature images, and determine the valid feature image data that actually participates in the convolution operation. Specifically, the data loading apparatus can acquire convolution parameters of the convolution operation. For example, the data loading apparatus can acquire the convolution kernel format, such as the convolution stride, the convolution kernel size and type used in the convolution operation, and determine the valid feature image data in the original feature image data based on the convolution stride, the convolution kernel size and type. The data loading apparatus then loads the valid feature image data corresponding to the sub-feature images into the target cache line as the data contents of the sub-feature images.

Figure 14:
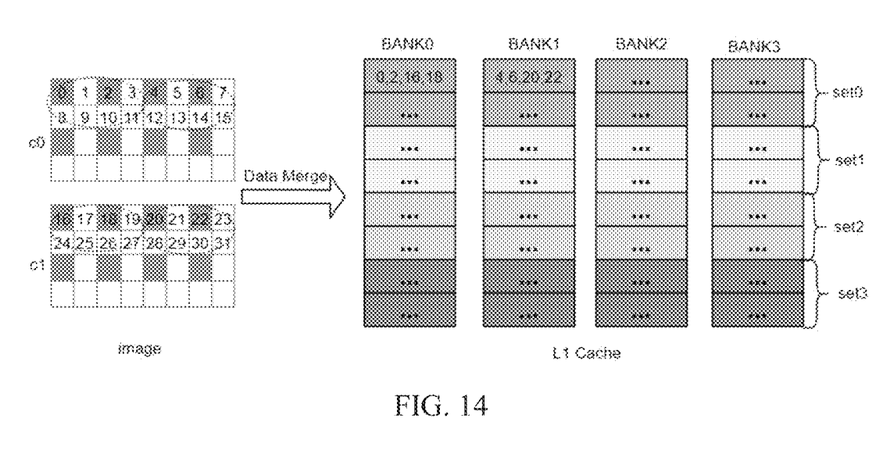
FIG. 14 is a schematic diagram showing data loading of another feature image according to an embodiment.

In order to make the technical solution and advantages of the present disclosure clearer, referring to FIG. 14, which illustrates the technical solution of the present embodiment with the convolution kernel size being 1*1 and the stride=2*2. Valid pixel points, such as pixel point 0, pixel point 2, pixel point 4, pixel point 6, pixel point 16, pixel point 18, pixel point 20, and pixel point 22, etc., in FIG. 14 are valid pixel points (pixel points with the shadow color in FIG. 14) are valid data required for the convolution kernel; and the invalid pixel points (pixel points with no color in FIG. 14) are data that do not participate in the current convolution operation. The data loading apparatus loads pixel values corresponding to valid pixel points such as the pixel point 0, pixel point 2, pixel point 4, pixel point 6, pixel point 16, pixel point 18, pixel point 20, and pixel point 22, etc., into the cache lines in the L1 cache.

The technical solution of this embodiment makes it possible to load the feature image data that actually needs to participate in the convolution operation into the L1 cache, which saves the precious storage space of the L1 cache, makes the valid data intensive, and reduces the probability of bank conflict, thereby improving the efficiency of the convolution operation.

In another embodiment, the step of extracting the valid feature image data from the original feature image data according to the convolution stride and the convolution kernel format includes: pixel points which participate in the convolution operation is determined from the sub-feature images and valid pixel points in the sub-feature images are acquired according to the convolution stride and the convolution kernel format; the pixel values corresponding to the valid pixel points serve as the valid feature image data corresponding to the sub-feature images.

The convolution kernel format can include information such as the convolution kernel type and the convolution kernel size. The convolution kernel type can include a standard convolution kernel and a dilated convolution kernel, etc.

In the specific implementation, in the process of extracting the valid feature image data from the original feature image data according to the convolution stride and the convolution kernel format, the data loading apparatus can determine the pixel point in each sub-feature image which is required to participate in the convolution operation according to the convolution stride of the convolution kernel, the convolution kernel type and the convolution kernel size, so as to determine the valid pixel point in each sub-feature image. The data loading apparatus determines the pixel values corresponding to the valid pixel points in the sub-feature images as the valid feature image data corresponding to the sub-feature images.

Figure 15:
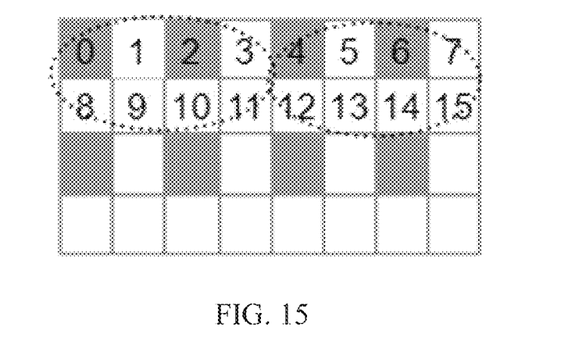
FIG. 15 is a schematic diagram illustrating a feature image according to an embodiment.

In order to facilitate those skilled in the art to understand, FIG. 15 exemplarily shows a schematic diagram of a feature image. As shown in FIG. 15, it is given that a standard convolution kernel with a size of 1*1 is used in the current convolution operation, and the convolution stride satisfies stride=2*2, the data loading apparatus can determine the pixel point 0 and the pixel point 2 in the feature image as valid pixel points of the sub-feature image 0, and determine the pixel point 4 and the pixel point 6 as valid pixel points of the sub-feature image 1.

In the technical solution of the present embodiment, the pixel points in the sub-feature image that participate in the convolution operation are determined and the valid pixel points in the sub-feature image are obtained according to the convolution stride and the convolution kernel format; the pixel values corresponding to the valid pixel points are determined as the valid feature image data corresponding to the sub-feature image, so that the data of the feature image actually required to participate in the convolution operation can be loaded into the L1 cache, thereby preventing too much redundant data from being loaded into the L1 cache, and improving a utilization ratio of the L1 cache.

In another embodiment, the step of splitting the feature image to be loaded into the cache unit into the plurality of sub-feature images includes: a feature image format of the feature image and a data capacity of a single cache bank are acquired; the feature image is split into a plurality of sub-feature images according to the feature image format of the feature image and the data capacity of the cache bank, to enable a data volume of a single sub-feature image to be $2^M$ times the data capacity of the cache bank, where M is an integer greater than or equal to 0.

In the specific implementation, in the process of splitting the feature image to be loaded into the cache unit into the plurality of sub-feature images, the processor can acquire the feature image format of the feature image and the data capacity (size) of the single cache bank, and equally divide each channel in the feature image into a plurality of sub-feature images (image blocks).

In practical applications, the data volume of the single sub-feature image and the data capacity of the cache bank can be expressed as:

$$\text{Size}_{image\_block} = 2^M * \text{Size}_{cache\_Bank},$$

Where M=0, 1, 2, 3, . . . .

In other words, a size of the sub-feature image block is 2M times the size of the cache bank in the L1 cache.

In the technical solution of the present embodiment, the feature image is split into a plurality of sub-feature images according to the feature image format of the feature image and the data capacity of the cache bank, so that subsequently a processor reasonably arranges each sub-feature image into each cache bank in the L1 cache, in order to subsequently read the target data from the L1 cache efficiently to perform the convolution operation, to speed up the efficiency of the convolution operation.

Figure 16:
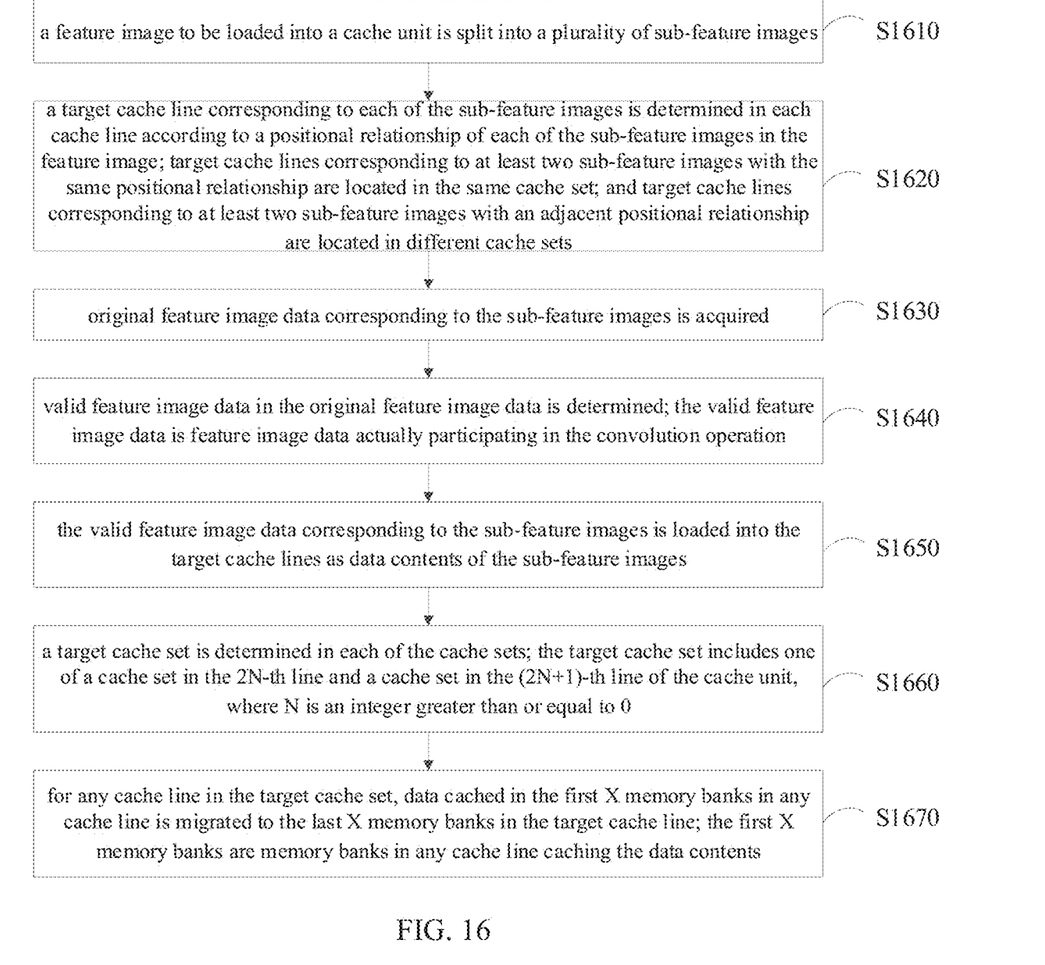
FIG. 16 is a flow chart showing a data loading method for a convolution operation according to another embodiment.

In another embodiment, as shown in FIG. 16, a data loading method for a convolution operation is provided, and the method is applied to a cache unit which is formed by a plurality of cache banks arranged an array. The same row of cache banks forms a cache line, and a plurality of cache lines forms a cache set. The method includes the following steps.

Step S1610: a feature image to be loaded into a cache unit is split into a plurality of sub-feature images.

Step S1620: a target cache line corresponding to each of the sub-feature images is determined in each cache line according to a positional relationship of each of the sub-feature images in the feature image; target cache lines corresponding to at least two sub-feature images with the same positional relationship are located in the same cache set; and target cache lines corresponding to at least two sub-feature images with an adjacent positional relationship are located in different cache sets.

Step S1630: original feature image data corresponding to the sub-feature images is acquired.

Step S1640: valid feature image data in the original feature image data is determined; the valid feature image data is feature image data actually participating in the convolution operation.

Step S1650: the valid feature image data corresponding to the sub-feature images is loaded into the target cache lines as data contents of the sub-feature images.

Step S1660: a target cache set is determined in each of the cache sets; the target cache set includes one of a cache set in the 2N-th line and a cache set in the (2N+1)-th line of the cache unit, where N is an integer greater than or equal to 0.

Step S1670: for any cache line in the target cache set, data cached in the first X memory banks in any cache line is migrated to the last X memory banks in the target cache line; the first X memory banks are memory banks in any cache line caching the data contents.

It should be noted that, for the specific definition of the above steps, reference can be made to the specific definition of the data loading method for the convolution operation above.

It should be appreciated that, although the steps in the flow charts described in the above embodiments are sequentially displayed according to the arrows, these steps are not definitely executed in the order indicated by the arrows. Unless explicitly stated herein, the execution of these steps is not strictly limited to the order, and these steps may be performed in other orders. Moreover, at least a part of the steps in the flow charts described in the above embodiments may include multiple steps or multiple stages, and these steps or stages are not definitely executed and completed at the same time, but may be performed at different time. The execution order of these steps or stages is not definitely sequential, but may be performed in turns or alternately with other steps or at least a part of the steps or stages in the other steps.

Based on the same inventive concept, in an embodiment of the present disclosure, a data loading apparatus for a convolution operation applied to implement the above-mentioned data loading method for the convolution operation is provided. The implementation solution for solving the problem provided by the apparatus is similar to the implementation solution described in the above method, so that as for the specific limitations in one or more embodiments of the data loading apparatus for the convolution operation provided below, reference can be made to the limitation of the data loading method for the convolution operation described above, which will not be repeated here.

Figure 17:
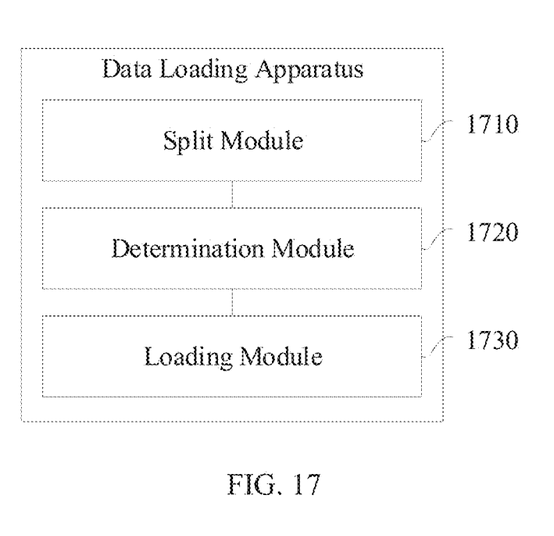
FIG. 17 is a structure diagram illustrating a data loading apparatus for a convolution operation according to an embodiment.

In an embodiment, as shown in FIG. 17, a data loading apparatus for a convolution operation is provided, which is applied to a cache unit which is formed by a plurality of cache banks arranged in an array, and the cache unit includes at least one cache set, each cache set includes at least one cache line. the apparatus includes:

a split module 1710, configured to split a feature image to be loaded into a cache unit into a plurality of sub-feature images;

a determination module 1720, configured to determine a target cache line corresponding to each of the sub-feature images in the at least one cache line according to a positional relationship of each of the sub-feature images in the feature image, in which target cache lines corresponding to at least two sub-feature images with the same positional relationship are located in the same cache set, and target cache lines corresponding to at least two sub-feature images with an adjacent positional relationship are located in different cache sets;

a loading module 1730, configured to load data contents of the sub-feature images into the target cache lines corresponding to the sub-feature images.

In an embodiment, the apparatus is further configured to determine a target cache set in each cache set. The target cache set includes one of a cache set in the 2N-th line and a cache set in the (2N+1)-th line of the cache unit, where N is an integer greater than or equal to 0. For any cache line in the target cache set, data cached in the first X memory banks in any cache line is migrated to the last X memory banks in the target cache line; the first X memory banks are memory banks in any cache line caching the data contents.

In an embodiment, the apparatus is further configured to acquire a cache set sequence number corresponding to each cache set in the cache unit; at least one cache set with a cache set sequence number being an odd number is determined as a target cache set; or, at least one cache set with a cache set sequence number being an even number is determined as the target cache set.

In an embodiment, the loading module 1730 is specifically configured to acquire original feature image data corresponding to the sub-feature images, determine valid feature image data in the original feature image data; the valid feature image data is feature image data that actually participates in the convolution operation; the valid feature image data corresponding to the sub-feature images is loaded into the target cache lines as the data contents of the sub-feature images.

In an embodiment, the loading module 1730 is specifically configured to acquire convolution parameters of the convolution operation, in which the convolution parameters include a convolution stride and a convolution kernel format, and to extract the valid feature image data in the original feature image data according to the convolution stride and the convolution kernel format.

In an embodiment, the loading module 1730 is specifically configured to determine pixel points in the sub-feature images participating in the convolution operation and obtain valid pixel points in the sub-feature images according to the convolution stride and the convolution kernel format, and determine pixel values corresponding to the valid pixel points as the valid feature image data corresponding to the sub-feature images.

In an embodiment, the split module 1710 is specifically configured to acquire a feature image format of the feature image and a data capacity of a single cache bank, split the feature image into a plurality of sub-feature images according to the feature image format of the feature image and the data capacity of the cache bank, to enable a data volume of the single sub-feature image to be $2^M$ times the data capacity of the cache bank, where M is an integer greater than or equal to 0.

Each module in the above-mentioned data loading apparatus for the convolution operation can be implemented in whole or in part by software, hardware and combinations thereof. The above modules can be embedded in or independent of the processor in the computer device in the form of hardware, or stored in the memory in the computer device in the form of software, so that the processor can call and execute the operations corresponding to the above modules.

Those of ordinary skill in the art can understand that all or part of the procedures in the method of the above embodiments can be implemented by instructing relevant hardware through a computer program, and the computer program can be stored in a non-transitory computer-readable storage medium, when the computer program is executed, the procedures in the above-mentioned method embodiments can be performed. Any reference to a memory, a database or other media used in the various embodiments provided in the present disclosure may include at least one of a non-transitory memory and a transitory memory. The non-transitory memory may include a Read-Only Memory (ROM), a magnetic tape, a floppy disk, a flash memory, an optical memory, a high-density embedded non-transitory memory, a resistive memory (ReRAM), a Magnetoresistive Random Access Memory (MRAM), a Ferroelectric Random Access Memory (FRAM), a Phase Change Memory (PCM), a graphene memory, etc. The transitory memory may include a Random Access Memory (RAM) or an external cache memory, and the like. As an illustration and not a limitation, the RAM may be in various forms, such as a Static Random Access Memory (SRAM) or a Dynamic Random Access Memory (DRAM). The database involved in the various embodiments provided in the present disclosure may include at least one of a relational database and a non-relational database. The non-relational database may include a blockchain-based distributed database, etc., but is not limited thereto. The processor involved in the various embodiments provided in the present disclosure may be a general-purpose processor, a central processing unit, a graphics processor, a digital signal processor, a programmable logic device, a data processing logic device based on quantum computation, etc., but is not limited thereto.

The technical limitations in the above embodiments can be combined arbitrarily. In order to make the description concise, all possible combinations of the technical limitations in the above embodiments are not described. However, as long as there is no contradiction in the combination of these technical limitations, theses combinations considered to fall within the scope of the present disclosure.

The above-mentioned embodiments merely some exemplary embodiments of the present disclosure, and the descriptions thereof are relatively specific and detailed, but should not be construed as a limitation on the scope of the present disclosure. It should be pointed out that those skilled in the art can make several modifications and improvements without departing from the concept of the present disclosure, which all belong to the protection scope of the present disclosure. Therefore, the scope of protection of the present disclosure is subject to the appended claims.

What is claimed is:

1. A data loading method for a convolution operation, applied to a cache unit which is formed by a plurality of cache banks arranged in an array, the same row of cache banks forming a cache line, a plurality of cache lines forming a cache set, the data loading method comprising:
   splitting a feature image to be loaded into the cache unit into a plurality of sub-feature images;
   determining a target cache line corresponding to each of the sub-feature images in each of the cache lines according to a positional relationship of each of the sub-feature images in the feature image; wherein target cache lines corresponding to at least two sub-feature images with the same positional relationship are located in the same cache set, and target cache lines corresponding to at least two sub-feature images with an adjacent positional relationship are located in different cache sets;
   loading a data content of each of the sub-feature images into the target cache line corresponding to each of the sub-feature images.

2. The data loading method according to claim 1, further comprising:
   after loading the data content of each of the sub-feature images into the target cache line corresponding to each of the sub-feature images,
   determining a target cache set in each cache set, wherein the target cache set comprises one of a cache set in the 2N-th line and a cache set in the (2N+1)-th line of the cache unit, and N is an integer greater than or equal to 0;
   for any cache line in the target cache set, migrating data cached in first X memory banks in any cache line to last X memory banks in a target cache line, wherein the first X memory banks are memory banks in any cache line caching data contents.

3. The data loading method according to claim 2, wherein the determining the target cache set in each cache set comprises:
   acquiring a cache set sequence number corresponding to each cache set in the cache unit;
   determining at least one cache set with a cache set sequence number of an odd number as the target cache set; or, determining at least one cache set with a cache set sequence number of an even number as the target cache set.

4. The data loading method according to claim 1, wherein the loading the data content of each of the sub-feature images into the target cache line corresponding to each of the sub-feature images comprises:
   acquiring original feature image data corresponding to the sub-feature images;

determining valid feature image data in the original feature image data, wherein the valid feature image data is feature image data which actually participates in the convolution operation;

loading the valid feature image data corresponding to the sub-feature images into the target cache lines as data contents of the sub-feature images.

5. The data loading method according to claim 4, wherein the determining valid feature image data in the original feature image data comprises:

acquiring convolution parameters of the convolution operation, wherein the convolution parameters comprise a convolution stride and a convolution kernel format;

extracting the valid feature image data from the original feature image data according to the convolution stride and the convolution kernel format.

6. The data loading method according to claim 5, wherein the extracting the valid feature image data from the original feature image data according to the convolution stride and the convolution kernel format comprises:

determining pixel points which participate in the convolution operation from the sub-feature images and acquiring valid pixel points in the sub-feature images according to the convolution stride and the convolution kernel format;

determining pixel values corresponding to the valid pixel points as the valid feature image data corresponding to the sub-feature images.

7. The data loading method according to claim 1, wherein the splitting the feature image to be loaded into the cache unit into the plurality of sub-feature images comprises:

acquiring a feature image format of the feature image and a data capacity of a single cache bank;

splitting the feature image into the plurality of sub-feature images according to the feature image format of the feature image and the data capacity of the cache bank, to enable a data volume of a single sub-feature image to be $2^M$ times the data capacity of the cache bank, wherein M is an integer greater than or equal to 0.

8. A data loading apparatus for a convolution operation, applied to a cache unit which is formed by a plurality of cache banks arranged in an array, the cache unit comprising at least one cache set, each cache set comprising at least one cache line, the apparatus comprising:

a split module, configured to split a feature image to be loaded into the cache unit into a plurality of sub-feature images;

a determination module, configured to determine a target cache line corresponding to each of the sub-feature images in the at least one cache line according to a positional relationship of each of the sub-feature images in the feature image, wherein target cache lines corresponding to at least two sub-feature images with the same positional relationship are located in the same cache set, and target cache lines corresponding to at least two sub-feature images with an adjacent positional relationship are located in different cache sets;

a loading module, configured to load data contents of the sub-feature images into target cache lines corresponding to the sub-feature images.

9. The apparatus according to claim 8, wherein the apparatus is further configured to: determine a target cache set in each cache set, the target cache set comprising one of a cache set in the 2N-th line and a cache set in the (2N+1)-th line of the cache unit, and N being an integer greater than or equal to 0; migrate data cached in first X memory banks in any cache line to last X memory banks in a target cache line for any cache line in the target cache set, the first X memory banks being memory banks in any cache line caching the data contents.

10. The apparatus according to claim 9, wherein the apparatus is further configured to acquire a cache set sequence number corresponding to each cache set in the cache unit, determine at least one cache set with a cache set sequence number of an odd number as the target cache set, or, determine at least one cache set with a cache set sequence number of an even number as the target cache set.

11. The apparatus according to claim 8, wherein the loading module is configured to acquire original feature image data corresponding to the sub-feature images, determine valid feature image data from the original feature image data, the valid feature image data being feature image data that actually participates in the convolution operation, and load the valid feature image data corresponding to the sub-feature images into the target cache lines as data contents of the sub-feature images.

12. The apparatus according to claim 11, wherein the loading module is configured to acquire convolution parameters of the convolution operation, the convolution parameters comprising a convolution stride and a convolution kernel format, and extract the valid feature image data from the original feature image data according to the convolution stride and the convolution kernel format.

13. The apparatus according to claim 12, wherein the loading module is configured to determine pixel points in the sub-feature images participating in the convolution operation and obtain valid pixel points in the sub-feature images according to the convolution stride and the convolution kernel format, and determine pixel values corresponding to the valid pixel points as the valid feature image data corresponding to the sub-feature images.

14. The apparatus according to claim 8, wherein the split module is configured to acquire a feature image format of the feature image and a data capacity of a single cache bank, split the feature image into a plurality of sub-feature images according to the feature image format of the feature image and the data capacity of the cache bank, to enable a data volume of the single sub-feature image to be $2^M$ times the data capacity of the cache bank, wherein M is an integer greater than or equal to 0.

* * * * *